(12) United States Patent
Jeske et al.

(10) Patent No.: US 6,359,045 B1
(45) Date of Patent: Mar. 19, 2002

(54) VULCANIZABLE RUBBER COMPOUNDS CONTAINING STYRENE-BUTADIENE AND BUTADIENE RUBBERS

(75) Inventors: Winfried Jeske, Burscheid; Hartmuth Buding, Titz; Hermann-Josef Weidenhaupt, Pulheim, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/437,651

(22) Filed: Nov. 10, 1999

(30) Foreign Application Priority Data

Nov. 16, 1998 (DE) .......................................... 198 52 647

(51) Int. Cl.⁷ .................................................. C08K 5/38
(52) U.S. Cl. ....................................... 524/201; 524/526
(58) Field of Search .................................. 524/201, 526

(56) References Cited

U.S. PATENT DOCUMENTS

| 3,869,435 A | | 3/1975 | Trivette, Jr. ............ 260/79.5 C |
| 3,979,369 A | | 9/1976 | Trivette, Jr. ............ 260/79.5 C |
| 4,946,887 A | * | 8/1990 | Takino et al. ................ 524/201 |
| 5,227,425 A | | 7/1993 | Rauline ....................... 524/493 |
| 5,342,900 A | | 8/1994 | Wolpers et al. ........... 525/329.3 |
| 5,430,086 A | * | 7/1995 | Saito et al. .................. 524/526 |
| 5,717,038 A | | 2/1998 | Horpel et al. ............. 525/332.4 |
| 5,886,086 A | * | 3/1999 | Hubbell et al. ............. 524/526 |

FOREIGN PATENT DOCUMENTS

| CA | 2193183 | 6/1997 |
| DE | 4435311 | 4/1996 |
| EP | 0 423 405 | 4/1995 |
| EP | 0 385 073 | 6/1995 |
| EP | 0 628 597 | 11/1997 |

\* cited by examiner

Primary Examiner—Bernard Lipman
(74) Attorney, Agent, or Firm—Joseph C. Gil; Noland J. Cheung

(57) ABSTRACT

This invention relates to vulcanizable rubber compounds based on styrene-butadiene rubber, which contain a special vulcanizing system, which are reinforced with silica and which contain a filler activator, for tire treads which exhibit improved abrasion-resistance.

4 Claims, No Drawings

VULCANIZABLE RUBBER COMPOUNDS CONTAINING STYRENE-BUTADIENE AND BUTADIENE RUBBERS

FIELD OF THE INVENTION

The present invention relates to vulcanizable rubber compounds, which amongst other constituents contain a styrene-butadiene rubber produced in solution and/or in emulsion, a butadiene rubber, optionally, natural rubber and/or synthetic cis-isoprene rubber, fillers, and a special vulcanizing system. The invention further relates to the use of said rubber compounds for the production of tires, particularly tire treads.

BACKGROUND OF THE INVENTION

One skilled in the art is aware that the sought-after properties of tires, such as low rolling resistance, low abrasion and high wet grip, can only be combined simultaneously with each other with difficulty, since these properties are sometimes in opposition to each other. Thus, for example, if carbon black is partly or completely replaced by silica as a filler, the rolling resistance of a tire is, in fact, reduced, but its abrasion-resistance is also reduced at the same time.

There has, therefore, been no lack of investigation aimed at reducing the rolling resistance without simultaneously reducing the abrasion-resistance during the production of tires. In order to solve this problem, namely to reduce the rolling resistance without reducing the abrasion-resistance at the same time, it is proposed in EP 0 501 227 that styrene-butadiene rubber produced in solution (S-SBR) be used in combination with a special silica and a filler activator.

Furthermore, EP 0 628 597 discloses the manner in which the rolling resistance can also be reduced, without simultaneously reducing the abrasion-resistance also, by employing a styrene-butadiene rubber which is produced in an emulsion (E-SBR) and which has been reinforced with silica and a filler activator.

EP 0 385 072 describes tire treads which exhibit an enhanced running performance and which are based on diene rubbers, the network bridges which consist of 1,2-dithioethanediyl bridges. Carbon black and silica are cited as possible fillers. Moreover, this application expressly mentions that $C_2$ crosslinking bridges are superior to other crosslinking bridges, such as $C_6$ or $C_8$ crosslinking bridges, particularly with regard to the extent of crosslinking achieved. It is also mentioned that the use of sulfur in addition, generally produces no advantages, since the reversion behavior is considerably impaired (see page 4, lines 11 to 13 and page 4, lines 27–28).

Furthermore, EP 0 432 417 describes a process for the production of tire treads which exhibit an enhanced running performance, which are based on polydiene rubbers and additive materials, and which employ systems of crosslinking agents which form $C_2$ crosslinking bridges, wherein it is mentioned, in particular, that crosslinking with additional sulfur addition, generally produces no advantages, since the reversion behavior is impaired (see page 5, lines 14–15).

Moreover, EP 0 530 590 discloses a process for producing diene rubber vulcanized materials, which apart from sulfur and mercapto accelerators, or sulphenamide accelerators, or mercapto accelerators and sulphenamide accelerators, also contain crosslinking agents which build $C_6$ or $C_2$ sulfur-containing bridges.

EP 0 385 073 describes vulcanized sidewalls of motor vehicle tires which are based on polydiene rubbers comprising $C_2$ to $C_6$ dithioalkanediyl bridges as network bridges. Vulcanized sidewalls of motor vehicle tires which are based on polydiene rubbers comprising $C_2$ to $C_6$ dithioalkanediyl bridges as network bridges are also described in EP 0 432 405. Furthermore, DE 22 56 511 and DE 22 65 382 describe the use of chemical compounds of general formula A—S—S—R—S—S—A' for the vulcanization of rubbers, wherein R in the above formula represents an arbitrary divalent organic radical and A and A' represent a large number of accelerator radicals, which amongst others include N-substituted thiocarbamoyl radicals. Said German patent applications describe vulcanized rubbers which comprise carbon black and silica as fillers but do not describe the combination thereof with filler activators.

However, the rubber compounds or vulcanized rubbers described in the afore-mentioned patent publications are in need of further optimization with regard to properties such as low rolling resistance, low abrasion and high wet grip, which are, particularly important in tire construction.

SUMMARY OF THE INVENTION

Therefore, the object of the present invention is to provide vulcanizable rubber compounds for the production of tire treads which exhibit an improved abrasion-resistance before aging and which are based on styrene-butadiene rubber (SBR) which is reinforced with silicas in combination with filler activators, without the rolling resistance and the wet grip of the tire tread thereby being simultaneously impaired.

It has surprisingly been possible to achieve this object by the provision of vulcanizable rubber compounds which are based on SBR, which contain silica and filler activators, and which comprise a special crosslinking agent which provides $C_6$ bridges in combination with a selected amount of sulfur and defined vulcanization accelerators. It has also surprisingly been found that if S-SBR is used, the rubber compounds according to the invention exhibit a shortened time of vulcanization (increase in productivity) in addition to a processing safety which is not inferior to that of prior art rubber compounds, and that these vulcanized rubbers according to the invention have a higher rebound resilience than that of prior art vulcanizates.

DETAILED DESCRIPTION OF THE INVENTION

The present invention therefore relates to vulcanizable rubber compounds comprising a) 20 to 90 parts by weight, preferably 40 to 85 parts by weight, of a styrene-butadiene rubber (SBR) which is produced in solution and/or in emulsion, b) 10 to 50 parts by weight, preferably 20 to 40 parts by weight, of a butadiene rubber (BR), c) 0 to 40 parts by weight, preferably 0 to 30 parts by weight, of natural rubber and/or of a synthetic cis-isoprene rubber (IR), d) 40 to 90 parts by weight, preferably 60 to 90 parts by weight, of silica in combination with a filler activator, e) customary additives, and f) a vulcanizing system comprising i) 0.5 to 3.5 parts by weight of chemical compound (I)

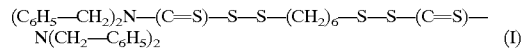

$(C_6H_5\text{—}CH_2)_2N\text{—}(C\!=\!S)\text{—}S\text{—}S\text{—}(CH_2)_6\text{—}S\text{—}S\text{—}(C\!=\!S)\text{—}N(CH_2\text{—}C_6H_5)_2$     (I)

ii) 0.3 to 1.5 parts by weight of sulfur, iii) 1 to 3 parts by weight of benzothiazyl-2-cyclohexylsulphenamide (CBS) and/or N-tert.-butyl-2-benzothiazylsulphenamide (TBBS), and iv) 0.5 to 4 parts by weight of N,N'-diphenylguanidine (DPG), wherein the parts by weight are given with respect to 100 parts by weight rubber.

Suitable styrene-butadiene rubbers (SBR) for the rubber compounds according to the invention include an SBR which is produced in solution (S-SBR), which has a styrene content of 10 to 35 parts by weight, preferably 15 to 30 parts by weight, a vinyl content of 10 to 60 parts by weight, preferably 18 to 60 parts by weight, and a glass transition temperature ($T_g$), as determined by means of DSC, from −80° to −10° C., preferably from −70° to −20° C., and/or an SBR which is produced in an emulsion (E-SBR), which has a styrene content of 15 to 45 parts by weight, preferably 20 to 40 parts by weight, a vinyl content of 10 to 18 parts by weight, and a $T_g$, as determined by means of DSC, from −60° to −25° C., preferably from −50° to −30° C., wherein the above parts by weight are each given with respect to 100 parts by weight of copolymer rubber.

A suitable butadiene rubber (BR) for the rubber compounds according to the present invention is a BR with a cis-1,4 content from 30 to 100 parts by weight, preferably from 90 to 100 parts by weight, per 100 parts by weight of said rubber.

The SBR and the BR can be used in unextended or in oil-extended form. The total oil content of the rubber compound is usually between 25 and 45 parts by weight with respect to 100 parts by weight of rubber.

Suitable natural rubbers (NR) for the rubber compounds according to the invention are the NR types which are customarily used in the tire industry. Suitable isoprene rubbers (IR) comprise products which are produced synthetically from isoprene and which have a cis-1,4 content of more than 90 parts by weight, particularly of more than 95 parts by weight, per 100 parts by weight of said rubber.

A preferred reinforcing filler for the rubber compounds according to the invention is highly dispersed silica, preferably in an amount of 60 to 90 parts by weight. Highly dispersed silica is produced, for example, by precipitation from solutions of silicates or by flame hydrolysis of silicon halides, and has a specific surface area of 20 to 400 m$^2$/g (BET surface area), preferably 100 to 250 m$^2$/g, particularly 120 to 200 m$^2$/g, and a primary particle size of 10 to 400 nm.

The preferred filler activators for the rubber compounds according to the invention comprise bis-(trialkoxysilylpropyl)-tetrasulphane and -disulphane, as well as 3-(trialkoxy-silyl)-1-propanethiol, wherein the alkoxy radical denotes methoxy or ethoxy, and also comprise the filler activators described in DE 44 35 311, which are used in amounts of 2 to 20 parts by weight, preferably 3 to 10 parts by weight, particularly 4 to 8 parts by weight, calculated in each case as 100% active ingredient and with respect to 100 parts by weight of rubber. Mixtures of these filler activators can also be used, however. Liquid filler activators can be absorbed on a carrier (dry liquids) in order to improve the dosing accuracy and/or dispersibility. Suitable supports include carbon blacks and silicas. Active or highly active carbon black is preferably used. The active ingredient content of the dry liquid is between 30 and 70 parts by weight, preferably between 40 and 60 parts by weight per 100 parts by weight of dry liquid.

Chemical compound (I) which provides $C_6$ dithioalkanediyl bridges is preferably used in amounts of 0.8 to 2.5 parts by weight. Suitable sources of sulfur include the sulfur or insoluble sulfur which is customarily used in the rubber processing industry. The preferred amount of sulfur is 0.5 to 1.0 parts by weight. Benzothiazyl-2-cyclohexylsulphenamide (CBS) and/or N-tert.-butyl-2-benzo-thiazylsulphenamide (TBBS) are used in particular in amounts of 1.5 to 2.5 parts by weight. The use of CBS on its own as the main accelerator is quite particularly preferred. N,N'-diphenylguanidine (DPG) is preferably added to the rubber compound as the secondary accelerator in amounts from 1 to 3 parts by weight, particularly in amounts from 1.5 to 2.5 parts by weight. All parts by weight mentioned here are based on 100 parts by weight of rubber.

Chemical compound (I) which provides $C_6$ dithioalkanediyl bridges can be synthesized in the usual manner according to the description given in EP 0 432 405.

Production of the rubber compounds according to the invention is effected in the manner known in the art by mixing the rubber components in suitable mixing units and with the addition of customary additives such as plasticizers, antidegradants, zinc oxide, stearic acid, resins and processing aids, (see W. Hoffmann, Rubber Technology Handbook, Hanser-Verlag, 1989, for example) in known amounts which depend on the respective purpose of use of the rubber compounds.

The rubber compounds according to the invention can be vulcanized in a known manner at temperatures from 120 to 220° C., preferably 140 to 200° C.

The rubber compounds according to the invention can be used for the production of tires, particularly for the production of tire treads.

The invention is further illustrated but is not intended to be limited by the following examples.

EXAMPLES 1–4

Explanations Relating to the Experimental Part

The following test methods or test apparatus were used: Mooney viscosity: DIN 53 523, large rotor, 100° C., preheating time 1 minute, testing time 4 minutes. Mooney scorch time: DIN 53 523, large rotor, 130° C., preheating time 1 minute. Rheometer: ASTM D 2084, Monsanto MDR 2000 E, 170° C. Tensile testing: DIN 53 405, dumb-bell. Hardness: DIN 53 505. Rebound resilience: DIN 53 512. Viscoelastic properties: DIN 53 513/150 4664, Roelig test, 10 Hz.

Test Procedure

The test rubber compounds listed in Table 1 were prepared using an internal mixer Type GK 1.5 E manufactured by Werner & Pfleiderer at a rotor speed of 70 rpm and at a chamber and rotor temperature of 80° C. (ram pressure 8 bar, filling ratio 65%). The amounts given are parts by weight per 100 parts by weight of rubber.

TABLE 1

| | Test formulation | | | |
|---|---|---|---|---|
| | Example 1 (Comparison) | Example 2 | Example 3 Comparison) | Example 4 |
| Mixture number | 1 | 2 | 3 | 4 |
| E-SBR[a)] | 103 | 103 | | |
| S-SBR[b)] | | | 103 | 103 |
| BR[c)] | 25 | 25 | 25 | 25 |
| silica[d)] | 70 | 70 | 70 | 70 |
| filler activator[e)] | 6 | 6 | 6 | 6 |
| carbon black N234 | 6 | 6 | 6 | 6 |
| plasticizer[f)] | 8 | 8 | 8 | 8 |
| 6PPD[g)] | 1.5 | 1.5 | 1.5 | 1.5 |

TABLE 1-continued

Test formulation

|   | Example 1 (Comparison) | Example 2 | Example 3 Comparison) | Example 4 |
|---|---|---|---|---|
| TMQ[h] | 1.5 | 1.5 | 1.5 | 1.5 |
| zinc oxide | 3 | 3 | 3 | 3 |
| stearic acid | 2 | 2 | 2 | 2 |
| CBS[i] | 1.8 | 1.8 | 1.8 | 1.8 |
| DPG[j] | 2 | 2 | 2 | 2 |
| sulfur | 1.5 | 0.5 | 1.5 | 0.5 |
| chemical compound (I) | 0 | 1 | 0 | 1 |

[a] Krynol ® 1721 manufactured by Bayer AG, Leverkusen, Germany, comprising 37.5 parts by weight of highly aromatic mineral oil, bound styrene: 40.0%, Mooney viscosity ML (1 + 4) 100° C. = 54
[b] Buna ® VSL 5025-1 manufactured by Bayer AG, Leverkusen, Germany, vinyl content: 50%, styrene content: 25%, oil content: 37.5%, Mooney viscosity ML(1 + 4) 100° C. = 50
[c] Buna ® CB 25 manufactured by Bayer AG, Leverkusen, Germany, cis-1,4 content: 96% minimum, Mooney viscosity ML (1 + 4) 100° C. = 44
[d] Vulkasil ® S manufactured by Bayer AG, Leverkusen, Germany, BET specific surface: 155–195 m$^2$/g, pH: 5.4–7.0
[e] Si 69 reinforcing additive (bis-(triethoxysilylpropyl)-tetrasulphane) manufactured by Degussa AG, Frankfurt, Germany
[f] Renopal ® 450 (aromatic mineral oil) manufactured by Fuchs Mineralölwerke GmbH, Mannheim, Germany
[g] Vulkanox ® 4020/LG (N-(1,3-dimethylbutyl)-N'-phenyl-p-phenylenediamine) manufactured by Bayer AG, Leverkusen, Germany
[h] Vulkanox ® HS/LG (polymerized 2,2,4-trimethyl-1,2-dihydroquinoline) manufactured by Bayer AG, Leverkusen, Germany
[i] Vulkacit ® CZ/C (benzothiazyl-2-cyclohexylsulphenamide, CBS) manufactured by Bayer AG, Leverkusen, Germany
[j] Vulkacit ® D/C (N,N'-diphenylguanidine) manufactured by Bayer AG, Leverkusen, Germany.

The mixing sequence for preparing the mixtures was selected as described below:

t=0 sec addition of polymers
t=10 sec ram down
t=60 sec ram up, addition of half the amount of silica and filler activator in each case, ram down
t=120 sec ram up, addition of the remaining amount of silica and filler activator, addition of carbon black, plasticizer, zinc oxide, stearic acid, 6PPD and TMQ, ram down
t=240 sec sweep down
t=300 sec dump On emptying the kneader, the temperature of the mixed materials was within the range from 148° to 151° C.

The vulcanizing system, consisting of sulfur, CBS, DPG and chemical compound (I), was mixed in on a mill at a mixing temperature of about 60° C.

The rheological data which were determined on the finish-mixed rubber compounds are given in Table 2.

TABLE 2

Rheological data on the test compounds

|   | Example 1 (Comparison) | Example 2 | Example 3 (Comparison) | Example 4 |
|---|---|---|---|---|
| Mixture number | 1 | 2 | 3 | 4 |
| ML (1 + 4) 100° C.(ME) | 77 | 79 | 60 | 58 |
| Mooney scorch time (130° C.) $t_5$ (min) | 19.6 | 20.2 | 22.2 | 26.1 |
| ts01 (min) | 0.8 | 0.9 | 1.2 | 1.4 |
| t95(min) | 10.3 | 6.5 | 7.4 | 7.9 |
| S'min (dNm) | 3.7 | 4.0 | 2.9 | 2.7 |
| S'max (dNm) | 24.7 | 23.3 | 24.2 | 23.3 |
| S'end. 30 min (dNm) | 24.7 | 23.2 | 22.4 | 22.5 |

The test results on the vulcanized rubbers which were produced from the rubber compounds according to the invention are given in Table 3. The vulcanization of the rubber compounds was made at a temperature of 170° C. during a time period of t 95+5 min.

TABLE 3

Properties of test vulcanized rubbers

|   | Example 1 (Comparison) | Example 2 | Example 3 (Comparison) | Example 4 |
|---|---|---|---|---|
| Mixture number | 1 | 2 | 3 | 4 |
| strength (MPa) | 18.4 | 19.0 | 23.7 | 24.4 |
| elongation at break (%) | 445 | 470 | 555 | 560 |
| modulus 100 (MPa) | 2.9 | 2.7 | 2.4 | 2.3 |
| modulus 300 (MPa) | 10.8 | 10.1 | 9.9 | 10.3 |
| hardness, 23° C. (Shore A) | 68 | 69 | 68 | 68 |

TABLE 3-continued

Properties of test vulcanized rubbers

|  | Example 1 (Comparison) | Example 2 | Example 3 (Comparison) | Example 4 |
|---|---|---|---|---|
| hardness, 70° C. (Shore A) | 66 | 66 | 64 | 64 |
| rebound resilience, 23° C. (%) | 28 | 30 | 28 | 28 |
| rebound resilience, 70° C. (%) | 47 | 50 | 48 | 49 |
| abrasion, emery 40 (mm³) | 159 | 137 | 141 | 107 |
| abrasion, emery 60 (mm³) | 102 | 81 | 81 | 70 |
| tan δ, 0° C. | 0.444 | 0.423 | 0.448 | 0.448 |
| dyn. modulus E', 0° C. (MPa) | 22.5 | 23.8 | 26.0 | 23.3 |
| loss modulus E", 0° C. (MPa) | 10.0 | 10.2 | 11.7 | 10.4 |
| tan δ, 60° C. | 0.129 | 0.130 | 0.141 | 0.136 |
| dyn. modulus E', 60° C. (MPa) | 8.2 | 8.4 | 9.6 | 9.2 |
| loss modulus E", 60° C. (MPa) | 1.1 | 1.1 | 1.4 | 1.2 |

The examples according to the invention show that vulcanized rubbers which exhibit low abrasion can be obtained with the rubber compounds according to the invention without the impairment of tan δ at 0° C., which correlates the wet grip of a tire tread, and without the impairment of tan δ at 60° C., which correlates with the rolling resistance of a tire tread. Low abrasion is synonymous with a high abrasion-resistance.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Vulcanizable rubber compounds comprising
   a) 20 to 90 parts by weight of a styrene-butadiene rubber produced in solution and/or in emulsion,
   b) 10 to 50 parts by weight of a butadiene rubber,
   c) 0 to 40 parts by weight of natural rubber and/or of a synthetic cis-isoprene rubber,
   d) 40 to 90 parts by weight of silica in combination with a filler activator,
   e) customary additives, and
   f) a vulcanizing system comprising
      i) 0.5 to 3.5 parts by weight of chemical compound (I)

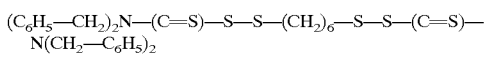

ii) 0.3 to 1.5 parts by weight of sulfur,
      iii) 1 to 3 parts by weight of benzothiazyl-2-cyclohexyl-sulphenamide and/or N-tert-butyl-2-benzothiazyl-sulphenamide, and
      iv) 0.5 to 4 parts by weight of N,N'-diphenylguanidine,
   wherein the parts by weight are given with respect to 100 parts by weight rubber.

2. The production of tires comprising vulcanizable rubber compounds comprising
   a) 20 to 90 parts by weight of a styrene-butadiene rubber produced in solution and/or in emulsion,
   b) 10 to 50 parts by weight of a butadiene rubber,
   c) 0 to 40 parts by weight of natural rubber and/or of a synthetic cis-isoprene rubber,
   d) 40 to 90 parts by weight of silica in combination with a filler activator,
   e) customary additives, and
   f) a vulcanizing system comprising
      i) 0.5 to 3.5 parts by weight of chemical compound (I)

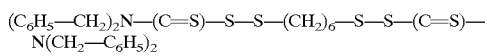

ii) 0.3 to 1.5 parts by weight of sulfur,
      iii) 1 to 3 parts by weight of benzothiazyl-2-cyclohexylsulphenamide and/or N-tert.-butyl-2-benzothiazylsulphenamide, and
      iv) 0.5 to 4 parts by weight of N,N'-diphenylguanidine,
   wherein the parts by weight are given with respect to 100 parts by weight rubber.

3. A tire comprising vulcanizable rubber compounds comprising
   a) 20 to 90 parts by weight of a styrene-butadiene rubber produced in solution and/or in emulsion,
   b) 10 to 50 parts by weight of a butadiene rubber,
   c) 0 to 40 parts by weight of natural rubber and/or of a synthetic cis-isoprene rubber,
   d) 40 to 90 parts by weight of silica in combination with a filler activator,
   e) customary additives, and
   f) a vulcanizing system comprising
      i) 0.5 to 3.5 parts by weight of chemical compound (I)

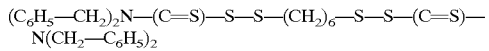

ii) 0.3 to 1.5 parts by weight of sulfur,
      iii) 1 to 3 parts by weight of benzothiazyl-2-cyclohexylsulphenamide and/or N-tert.-butyl-2-benzothiazylsulphenamide, and
      iv) 0.5 to 4 parts by weight of N,N'-diphenylguanidine,
   wherein the parts by weight are given with respect to 100 parts by weight rubber.

4. A tire according to claim 3, wherein the tire tread of said tire comprises said vulcanizable rubber compound.

* * * * *